United States Patent [19]

Yocum et al.

[11] 4,211,386

[45] Jul. 8, 1980

[54] SLOW OPENING CYLINDER VALVE

[75] Inventors: William C. Yocum, Mt. Lebanon Township, Allegheny County; David E. Hughes, Whitehall Borough, both of Pa.

[73] Assignee: Superior Valve Company, Washington, Pa.

[21] Appl. No.: 24,560

[22] Filed: Mar. 28, 1979

[51] Int. Cl.² ............................................. F16K 1/52
[52] U.S. Cl. .................................. 251/122; 251/210
[58] Field of Search ................ 251/120, 121, 210, 122

[56] References Cited

U.S. PATENT DOCUMENTS

| | | | |
|---|---|---|---|
| 1,884,442 | 10/1932 | Wells et al. | 251/210 |
| 2,439,282 | 4/1948 | Beckett | 251/120 X |
| 3,166,289 | 1/1965 | Engstrom | 251/35 |

*Primary Examiner*—Arnold Rosenthal
*Attorney, Agent, or Firm*—Buell, Blenko & Ziesenheim

[57] ABSTRACT

A valve for controlling the flow of gases from high pressure cylinders is provided having a projected raised annular valve seat surrounding a gas passage, a stem in threaded relation to the valve body whereby rotation of the valve stem in the valve body moves the valve stem toward and away from the valve seat, a circumferential shroud extending from the end of the valve stem and surrounding the valve seat when the valve is closed and partially open, a resilient seal member positioned within the recess on the end of the valve stem formed by the shroud, said resilient seat member having a tapered projection which extends into the gas inlet passage when the valve is in closed position and provides a gas tight seal between the valve stem and the valve seat.

8 Claims, 3 Drawing Figures

SLOW OPENING CYLINDER VALVE

This invention relates to valves for controlling flow of gases from cylinders in which the gases are stored under pressure. More particularly, the invention relates to the configuration of the valve stem, insert and raised annular seat to cause the opening of the valve to be slow in relation to rotational displacement of the handwheel.

The distribution of compressed gases within cylinders is widespread in industry. A valve is ordinarily threaded into an opening in the cylinder to control flow of gas from the cylinder. The gases are often stored at high pressure which may be as high as 3500 psig. In conventional valves, a small rotation of the handwheel from closed position will cause the valve to open sufficiently for pressure to build up on the downstream side very quickly. It has been found that turning the handwheel and stem as little as one eighth of a turn may permit gas to flow at about 40% of the capacity of the valve and that when opened one-quarter turn the valve will pass on the order of two-thirds its flow capacity. If the downstream side of the valve is substantially at atmospheric pressure and the valve is opened to permit a rush of high pressure gas, e.g. at up to 3500 psig, the surge can easily cause undesirable shock waves in the low pressure, downstream section. It is a good practice, therefore, to merely "crack" the valve until the pressures have had a chance to equalize and the flow to stabilize. In view of the relatively small rotation of the handwheel of a cylinder valve for substantial flow, it is difficult to "crack" the valve enough to bleed gas to the low pressure side without risk of shock waves. Moreover, the person opening the valve may, through carelessness or inadvertence, open it rapidly to cause a substantial shock wave to travel downstream.

If the high pressure gas is released with a rush it will travel downstream until it reaches the regulator where the shock wave will rebound and may be hit by a second advancing shock wave. Recompression of the gas due to the dynamic effects of the moving gas will generate substantial heat, often referred to as "heat of recompression", or "adiabatic compression". It is recognized that adiabatic compression of gases from pressure spikes due to fast operation of valves in high pressure systems, oscillatory flow or other sudden pressurization can cause localized temperature increases. If the gas is an oxidizer such as oxygen the gas will support combustion and the heat may be sufficient to ignite many materials such as organic contaminants or fine particles. In an extreme case, the heat could result in melting of metal in the regulator causing a hole to be blown in the regulator housing. Even if there is no immediate damage the presence of pressure spikes in a high pressure gas system will place undue and unnecessary strain on the components, especially the regulator diaphragm, spring and seals causing premature failure.

In the case of acetelyene, heat produced by an outside source may cause decomposition of the acetelyene which produces results similar to a flame front.

The undesirable effects of adiabatic compression of a gas or decomposition can be minimized or eliminated by avoiding the production of pressure spikes and by removing unwanted heat.

We provide a valve having a valve body including a cavity therein, an annular valve seat, and stem member moveable toward and away from the valve seat for closing and opening the valve. We further provide a circumferential wall in the valve stem member which surrounds the valve seat when the stem is in closed and partially open positions. We further provide tapered means associated with the valve stem and projecting into the central passage of the annular valve seat. We prefer that the tapered means be an insert of resilient material placed within the circumferential wall on the valve stem and projecting toward the annular valve seat. By reason of the taper, movement of the valve stem away from the valve seat increases the clearance between the projecting portion and the valve seat.

Other details, objects and advantages of our invention will become more apparent as the following description of a present preferred embodiment of our invention proceeds. In the accompanying drawings we have illustrated a present preferred embodiment of our invention in which.

Figure 1:
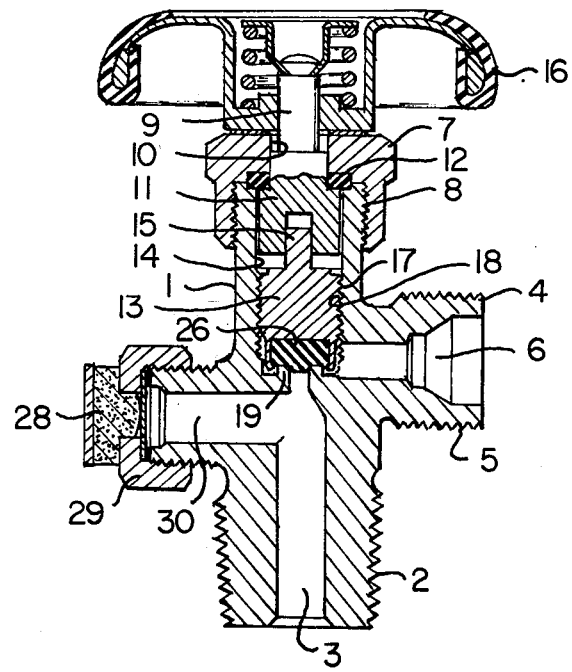
FIG. 1 is a sectional view of a high pressure oxygen cylinder valve embodying the invention.

FIG. 1 shows a cylinder valve comprising a valve body 1. The valve body includes a gas inlet through which a high pressure gas such as oxygen is received from a high pressure cylinder and an outlet through which gas is delivered to the regulator or other fitting. The inlet is provided with threads 2 by which the valve is threaded into a high pressure oxygen cylinder. An inlet passage 3 provides for flow of gas into the valve body from the cylinder. An outlet 4 is provided with threads 5 for connection of the fitting. An outlet passage 6 is formed within the outlet. A bonnet 7 is threaded on to valve body 1 by threads 8. An upper stem 9 extends through an opening 10 in bonnet 7 and terminates in a yoke 11. Upper stem 9 is sealed to the bonnet by a compressible gasket 12 which surrounds the shaft adjacent opening 10 and rests on a valve body shoulder to provide a gas tight seal.

A valve stem 13 is fitted in a cavity 14 within valve body 1. Valve stem 13 includes a spline 15 which is engaged by yoke 11. A handwheel 16 is fastened to upper stem 9 for rotation of upper stem 9. Valve stem 13 has threads 17 around its outer circumference which engage cooperating threads 18 formed internally of valve body 1 in cavity 14. Rotation of handwheel 16 causes rotation of upper stem 9 and yoke 11. Since spline 15 engages yoke 11, valve stem 13 is also rotated by rotation of handwheel 16. There is sufficient axial clearance for valve stem 13 to move axially within the valve body due to screw action without any axial movement of upper stem 9.

An annular raised valve seat 19 projects upwardly from valve body 1 in the bottom of cavity 14 and surrounds inlet passage 3. Valve seat 19 includes an inner circumferential surface 20, an outer circumferential surface 21 and a laterally extending sealing surface 22.

Figure 2:
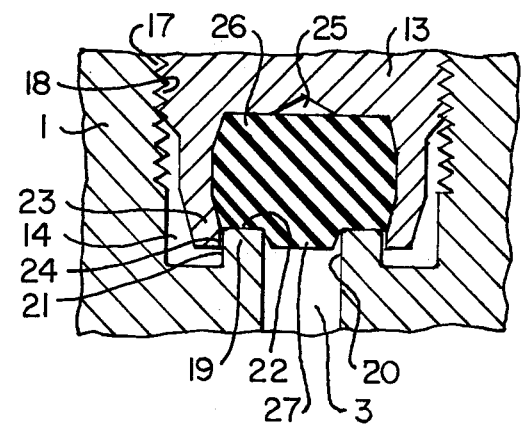
FIG. 2 is a fragmental sectional view showing the valve seat and valve stem of FIG. 1 in greater detail with the valve in closed position.

The lower end of valve stem 13 has a circumferential shroud 23 having an inner circumferential surface 24 adjacent its lower end. Shroud 23 forms a recess in the end of valve stem 13. When the valve stem is in closed position as shown in FIG. 2 surface 24 closely surrounds surface 21. Preferably, a clearance is provided in the order of 0.001 to 0.010 inch. A cavity 25 is formed in the bottom of valve stem 13. A resilient sealing member 26 of nylon or other plastic, for example, is fitted within the recess and engages valve seat 19. The lower end of sealing member 26 includes a tapered projection 27 which extends into valve inlet passage 3.

A fusible metal plug or a rupture disc 28 may be provided to release pressure in case of a fire. Fusible member 28 is held in position by a threaded coupling 29 and communicates with a branch passage 30 extending from inlet passage 3.

The valve is ordinarily threaded into the opening of a compressed gas cylinder by threads 2. A fitting connected to a regulator or other equipment is screwed onto threads 5 at the outlet. When handwheel 16 has been turned to close the valve, valve stem 13 will be in the position shown in FIG. 2. The resilient member 26 will be forced against the upper surface 22 of valve seat 19 preventing flow from inlet passage 3 to outlet passage 6. Projection 27 is tapered and has a larger diameter at its root than at its extremity. The diameter at the root is preferably greater than the diameter formed by wall 20. Accordingly, when the valve is fully closed as shown in FIG. 2 there will be interference between nylon member 26 and wall 20. A seal is formed in that area as well as between nylon member 26 and sealing surface 22.

Figure 3:
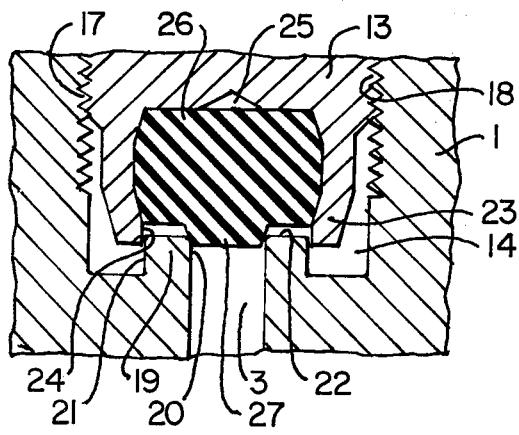
FIG. 3 is a fragmentary sectional view like FIG. 2 showing the valve in partially open position.

The valve is opened by turning handwheel 16. Rotary motion is transmitted through shaft 9 and yoke 11 to spline 15 causing rotation of valve stem 13. Rotation of valve stem 13 in threads 18 will cause the valve stem to move away from seat 19 as shown in FIG. 3. As the valve stem is moved toward open position the clearance between surface 22 and nylon insert 26 will develop and increase. The interference between wall 20 and projection 27 will be reduced and clearance will develop. As clearance develops high pressure gas will start flowing from inlet passage 3 through the clear space between nylon member 26 and valve seat 19. The gas then passes through the gap between wall 21 and wall 24 and into outlet passage 6. The tortuous and confined path which must be followed by the gas in passing from inlet passage 3 to outlet passage 6 exerts significant throttling effect on gas flow until the valve has opened a substantial distance. As a result the valve has an unusually limited flow capacity during initial opening of the valve. It is, therefore, possible to "crack" the valve safely and to allow a restricted flow of gas to move downstream through outlet passage 6. A valve constructed as shown in the drawings will require approximately one full turn of the stem to reach substantially open position. In contrast a comparable valve of conventional design will increase the flow capacity very rapidly upon initial opening and will reach substantially full flow in less than ½ turn.

While the valve which has been described above is especially useful in dealing with high pressure gases such as oxygen, the design is also advantageous in dealing with a gas such as acetylene which can decompose.

The narrow clearance between outer wall 21 of valve seat 19 and the inner face 24 of shroud 23 will present a substantial area of metal in juxtaposition to any flame front. The metal may thereby tend to quench and extinguish any fire which may be generated in the line on the downstream side of the valve and to prevent the fire from flashing back into the storage cylinder or from the valve seat to the downstream side.

While we have illustrated and described a present preferred embodiment of our invention, it will be understood that the invention is not limited thereto and may be otherwise variously practiced within the scope of the following claims.

We claim:

1. A cylinder valve comprising a valve body having a projecting raised annular valve seat surrounding a gas passage, a stem in threaded relation to the valve body whereby rotation of the valve stem in the valve body moves the valve stem toward and away from the valve seat, a circumferential shroud extending from the end of the valve stem and surrounding the valve seat when the valve is closed and partially open, a resilient seal member positioned within the recess on the end of the valve stem formed by the shroud, said resilient seal member having a tapered projection which extends into the gas inlet passage when the valve is in closed position and provides a gas tight seal between the valve stem and the valve seat.

2. A cylinder valve as set forth in claim 1 in which the clearance between the shroud on the valve stem and the valve seat restricts gas flow during at least some operation of the valve.

3. A cylinder valve as set forth in claim 1 in which the clearance between the shroud on the valve stem and the valve seat is between about 0.001 inch and 0.010 inch.

4. A cylinder valve as set forth in claim 1 in which the resilient seal member is in interference fit with the valve seat when the valve is in closed position.

5. In a cylinder valve having a valve body including a cavity therewithin, an annular valve seat extending into the cavity and surrounding a gas passage for flow of gas through the valve, and a valve stem threadably fitted within the cavity for movement toward and away from the valve seat, the improvement which comprises a circumferential shroud formed on the valve stem extending toward the valve seat, and surrounding the valve seat when the valve is closed and partially open, a resilient seal member within the recess formed by the shroud and having a tapered projection fitting into the gas passage within the valve seat.

6. A cylinder valve as set forth in claim 5 in which the clearance between the shroud and the valve seat restricts flow of gas through the valve under at least some conditions.

7. A cylinder valve as set forth in claim 5 in which the clearance between the shroud and the valve seat is between about 0.001 inch and about 0.010 inch.

8. A cylinder valve as set forth in claim 5 in which the resilient seal member is distorted by the valve seat when the valve is in closed position.

* * * * *